United States Patent
Lee et al.

(10) Patent No.: US 7,675,204 B2
(45) Date of Patent: Mar. 9, 2010

(54) MOTOR FOR CONTROLLING INVERSE ROTATION OF ROTOR

(75) Inventors: Dong Il Lee, Kyunggi-do (KR); Han Gee Kim, Kyungsangnam-do (KR); Hyoun Jeong Shin, Inchun-si (KR)

(73) Assignee: LG Electronics Inc., Seoul (KR)

( * ) Notice: Subject to any disclaimer, the term of this patent is extended or adjusted under 35 U.S.C. 154(b) by 503 days.

(21) Appl. No.: 11/557,207

(22) Filed: Nov. 7, 2006

(65) Prior Publication Data

US 2007/0126294 A1 Jun. 7, 2007

(30) Foreign Application Priority Data

Nov. 16, 2005 (KR) .................... 10-2005-0109786

(51) Int. Cl.
*H02K 7/118* (2006.01)
*H02K 7/10* (2006.01)

(52) U.S. Cl. .................. 310/41; 310/83; 310/156.78; 310/156.79

(58) Field of Classification Search .............. 310/41, 310/114, 266, 83, 75 R, 76, 156.78, 156.79, 310/156.81

See application file for complete search history.

(56) References Cited

U.S. PATENT DOCUMENTS

| 3,525,888 | A | * | 8/1970 | Linn ........................... 310/41 |
| 6,273,351 | B1 | | 8/2001 | Tsukihiji et al. | |
| 6,894,412 | B2 | * | 5/2005 | Han et al. .................... 310/112 |
| 2006/0284500 | A1 | * | 12/2006 | Han et al. .................. 310/75 R |
| 2007/0126294 | A1 | * | 6/2007 | Lee et al. ...................... 310/78 |

FOREIGN PATENT DOCUMENTS

| CN | 1087212 A | | 5/1994 |
| JP | 6-062546 | * | 3/1994 |

OTHER PUBLICATIONS

Manual Translation of JP 06-062546, Yamanaka et al. Mar. 4, 1994, "Rotation Direction Regulation Mechanism for Small Motor".*
Manual Translation of CH 10872212, Gutian Xiuyi, May 25, 1994, "An Anti-Reversion Structure of a Small Type Motor".*

* cited by examiner

*Primary Examiner*—Karl I Tamai
(74) *Attorney, Agent, or Firm*—Birch, Stewart, Kolasch & Birch, LLP (57) ABSTRACT

Disclosed related to provide a motor reliable as capable of controlling the backward rotation of the rotor R for certain. The motor according to the present invention comprises a stator 2; a rotor R rotated by the interaction with between the stator 2 for generating the rotary force of the first rotation direction; a first interference element 32 equipped at the rotor R for rotating in one structure with the rotor R; a second interference element 34 equipped to be engaged with the first interference element 32 as rotated toward the first interference element 32 for controlling the second rotation direction different with the first rotating direction of the rotor R; and a second interference element 34 operating element deliver the rotary force of the rotor R to the second interference element 34 with the magnetism for the second interference element 34 to be rotated toward the first interference element 32 when the rotor R is rotated toward the second rotating direction.

20 Claims, 5 Drawing Sheets

MOTOR FOR CONTROLLING INVERSE ROTATION OF ROTOR

This Nonprofisional application claims priority under 35 U.S.C. § 119(a) on Patent Application No. 10-2005-0109786 filed in Korea on Nov. 16, 2005, the entire contents of which are hereby incorporated by reference.

BACKGROUND OF THE INVENTION

1. Field of the Invention

The present invention relates to a motor generating a rotation driving force and, more particularly, to a motor capable of controlling the backward rotation of the rotor for rotating forward.

2. Description of the Conventional Art

Generally, a motor is an apparatus composed of a stator, a rotor, a motor driving circuit unit and etc, and generating a rotation driving force as the rotor is rotated by the electromagnetic interaction according to the controlling of the motor driving circuit unit.

In the motor, as an apparatus using the rotation driving force of the motor can be malfunctioned or damaged according to the rotating direction of the rotor, the rotor rotates only forward direction that an apparatus using the rotation driving force of the motor requires.

A device for controlling the backward rotation of the rotor is needed, because the rotor can be rotated backward when the driving of the motor or by the external force.

SUMMARY OF THE INVENTION

The present invention is contrived to overcome the above-mentioned conventional problems, and an object of the present invention is to provide a motor that controls the backward rotation of the rotor so as to rotate only forward direction that the apparatus using the rotation driving force of the motor requires.

The present invention for achieving the above-mentioned object provides the motor which is composed of the stator; the rotor rotated by the interaction with the stator for generating the rotating force of the first rotating direction; the first interference element equipped at the rotor to be rotated in one structure with the rotor; the second interference element equipped to be interfered with the first interference element as rotated toward the first interference element for controlling the rotation in the second rotating direction opposite to the first rotaing direction; and the second interference element operating apparatus which delivers the driving force of the rotor to the second interference element with the magnetic force for rotating the second interference element toward the first interference element when the rotor rotates toward the second rotating direction.

The motor according to the present invention is effective that the apparatus using the rotation driving force of the motor doesn't control the rotor to satisfy the request when the rotor is rotated toward the first rotating direction, that is the forward direction, and the backward rotation of the rotor is controlled by the mutual interference of the first and the second interference elements when the rotor is rotated toward the second rotating direction, that is the backward direction.

ACCOUNTS FOR THE REFERENCE NUMERALS OF THE PRINCIPLE PARTS OF THE DRAWINGS

2: stator
10: inductor rotor
20: synchronous machine rotor
30: rotor backward rotation control apparatus
32: the first interference element
34: the second interference element
40: the second interference element operating apparatus
42: the first magnet gear
44: the second magnet gear
46: stopper

DETAILED DESCRIPTION OF THE PREFERRED EMBODIMENT

Hereinafter, embodiments of a motor according to the present invention will be described with reference to the accompanying drawings.

Although a motor in accordance with the present invention may be embodied in a variety of forms, the preferred embodiments of the motor will be described hereinafter. Meanwhile, since the basic structure of the motor is identical to that of a conventional motor, a detailed description thereof will be omitted.

Figure 1:
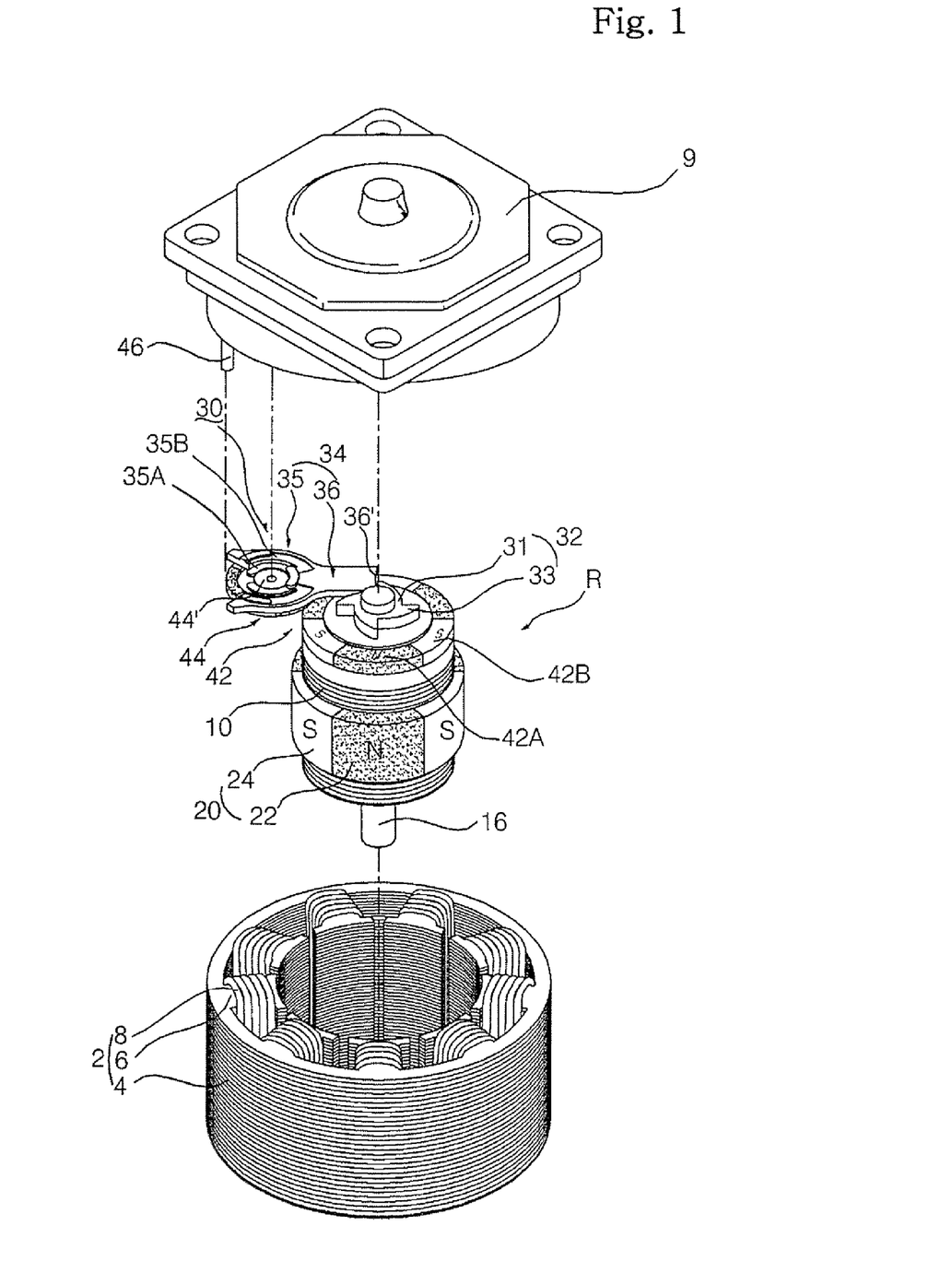
FIG. 1 shows an exploded perspective view of the motor according to the first preferred embodiment of the present invention.
Figure 2:
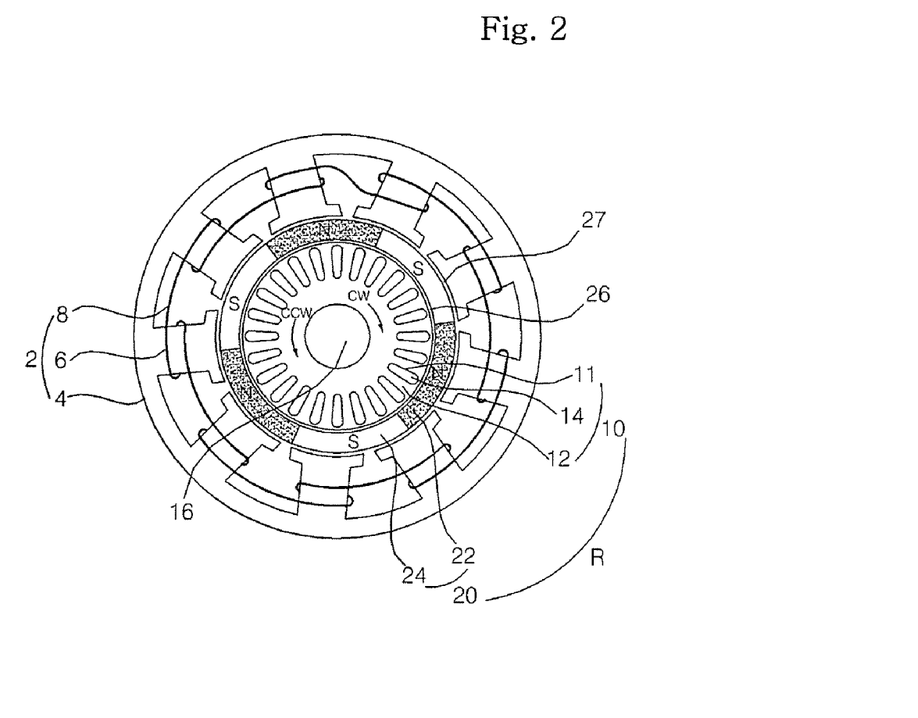
FIG. 2 shows a plane view of the stator and the rotor of the motor according to the first preferred embodiment of the present invention.
Figure 3:
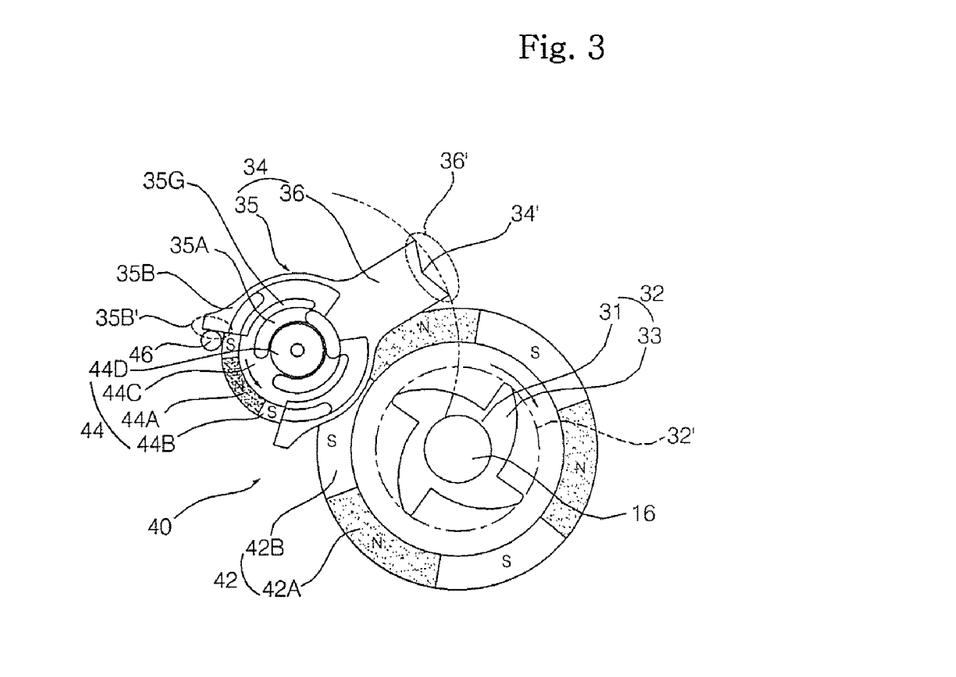
FIG. 3 shows a plane view illustrating the movement of the rotor of the motor according to the first preferred embodiment of the present invention when it is rotated forward.
Figure 4:
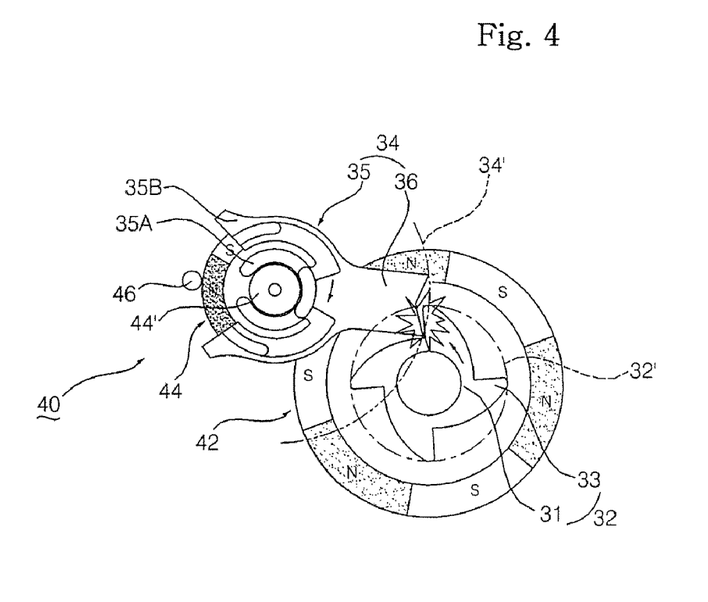
FIG. 4 shows a plane view illustrating the backward rotation controlling movement of the rotor of the motor according to the first preferred embodiment of the present invention.

FIG. 1 is an exploded perspective view of the motor according to the first preferred embodiment of the present invention, FIG. 2 is a plane view illustrating the stator and the rotor of the motor according to the first preferred embodiment of the present invention, FIG. 3 is a plane view illustrating the movement of the rotor according to the first preferred embodiment of the present invention when it is rotated forward, and FIG. 4 is a plane view illustrating the backward rotation controlling movement of the rotor according to the first preferred embodiment of the present invention.

The motor according to the first preferred embodiment of the present invention is a hybrid induction motor among the various types of motor, and comprises a stator 2 connected with the motor driving circuit unit, a rotor R rotated by the electromagnetic interaction with the stator 2 as rotatably installed in the stator 2, and the rotor backward rotation control apparatus 30 capable of controlling the rotation of the rotor toward the second rotating direction—call backward on the following—different from the first rotating direction—call forward on the following—that the apparatus using the rotation driving force of the motor requires. It is possible for the rotor R of the motor to be installed in the inside of the stator 2 or outside of the stator 2. It will be described set limited to the rotor R positioned in the inside of the stator 2 on the following present embodiment. It is also possible for the motor that the forward rotation of the rotor R is clockwise rotation CW or counter clockwise CCW. It will be described set limited to the forward rotation of the rotor R is clockwise rotation CW and the backward rotation of the rotor is counter clockwise CCW on the following present embodiment.

The stator 2 includes a yoke 4 ring-shaped for the rotor R to be rotatably positioned in the inside of the stator 2, teeth 6 arranged as radial shape centering around the stator 2 on the inner wall of the yoke 4, and coils 8 wound on each of the teeth 6 and connected with the motor driving circuit unit. The stator is supported as coupled with the motor bracket 9 equipped on a side of the stator 2.

The rotor R is composed of an inductor rotor 10 interacting with the stator 2 by the principle of the inductor as installed capable of rotating at the center of the inside of the stator 2 and the synchronous machine rotor 20 interacting with the stator by the principle of the synchronous machine as positioned capable of rotating between the inductor rotor 10 and the stator 2.

The inductor rotor 10 has a nearly round-shaped plane section, and it is composed of a core 12 has a slot 11 of multitude formed radially centering around the center of the inductor rotor 10 and conductor bars 14 inserted into each of the slots 11 at the core 12. A driving shaft 16 generating rotation driving force of the motor of the present invention as rotating with the inductor rotor in one unification is connected to the core 12 of the induction rotor 10. The driving shaft 16 is installed at the center of the core 12 of the inductor rotor 10. Multitudes of the slot 11 of the inductor rotor 10 may be located around the outer circumferential end.

The synchronous machine rotor 20 is composed of a free magnet that several magnets of the North Pole 22 and several magnets of the South Pole 24 are arranged as ring-shaped by turns along the circumference of the rotor R. The synchronous machine rotor 20 has a predetermined inner air gap 26 adjacent to the inductor rotor 10, and also has a predetermined outer air gap 27 adjacent to the stator 2. That is, the synchronous machine rotor 20 has a dual air gap with the inductor rotor 10 and the stator 2. The height of the Ox direction of the synchronous rotor 20 can be shorter than the height of the Ox direction of the inductor rotor 10. In case that the height of the Ox direction of the synchronous rotor 20 is shorter than the height of the Ox direction of the inductor rotor 10, the synchronous rotor 20 can be positioned at the center of the inductor rotor in the axial direction of the inductor rotor 10.

The rotor backward rotation control apparatus 30 is composed of the first interference element 32 equipped capable of rotating in one structure with the rotor at the rotor R, the second interference element 34 capable of controlling the backward rotation CCW as rotated toward the first interference element 32 and coupled with the first interference element 32, and the second interference element operating apparatus 40 rotating the second interference element 34 toward the first interference element 32 when the rotor R is rotated backward CCW.

The first interference element 32, can be positioned at one side of the both sides of the axial direction, is positioned at a side of the motor bracket 9 of the rotor not to interfere the coupling of the apparatus using the rotation driving force of the motor and the motor according to the present invention. In addition, it is possible for the first interference element 32 to be coupled with the inductor rotor 10, the synchronous machine rotor 20, or both of the rotors R together. It is described set limited that the first interference element 32 is coupled with the inductor rotor 10 as considering the ease of the plan and the assembling on the present invention.

The first interference element 32 is composed of a hub 31 the center of the first interference element 32 arranged that the center is be identified with the center of the rotor R and a teeth 33 protruded toward the second interference element 34 from the hub 31. A driving shaft 16 is penetrated through the hub 31 of the first interference element 32. The tooth 33 of the first interference element 32 can be one, and can be plural for the rapid interference of the first and second interference element 32, 34 when the rotor R rotates backward CCW. It is described set limited that the four of the tooth 33 of the first interference element 32 are equipped on the present invention. The four of the tooth 33 of the first interference element are arranged radially centering around the center of the first interference element 32. The length of each of the tooth 33 of the first interference element can be decided in the radial direction of the first interference element as the trace of the rotation 32' of the first interference element that the free end of the first interference element 32 draws can be smaller than the outer diameter of the rotor R. Furthermore, the length of each of the tooth 33 of the first interference element 32 is decided in the radial direction of the first interference element 32 as the trace of the rotation 32' of the first interference element is smaller than the outer diameter of the inductor rotor 10. Each of the tooth 33 of the first interference element 32 are formed inclined against the radial direction of the rotor and toward the rotation backward to go over as touching the second interference element 34 when the rotor R rotates forward CW and to generate interference as coupled with the second interference element 34 when the rotor R rotates backward CCW. On each of the tooth 33 of the first interference element 32, a side of the forward rotation direction CW of the rotor R is curved against the radial direction of the rotor R, and the other side of the backward rotation direction CCW of the rotor R is nearly identified with the radial direction of the rotor R.

The second interference element 34 is composed of a hub 35 coupled with the second interference element operating apparatus 40 and a pole 36 generating interference with the tooth 33 of the first interference element as protruded toward the first interference element 32 at a side of the hub 35 of the second interference element 34 to be capable of overlapped with a side of the trace of the rotation 34' of the second interference element.

The hub 35 of the second interference element 34 can be coupled as capable of rubbed with the second interference element operating apparatus 40. The hub 35 of the second interference element 34 is dual structure. That is, the hub 35 of the second interference element 34 is composed of an inner hub 35A directly connected with the second interference operating apparatus 40 and an outer hub 35B arranged at the outside of the inner hub 35A as having a predetermined gap 35G. On the hub 35 of the second interference element 34, at least the outer hub 35B is formed as an arch shape. The both ends 35B' of the arch-shaped outer hub 35B of the second interference element 34 are wound toward the outside of the hub 35 of the second interference element 34.

On the pole 36 of the second interference element 34, the free end 36' which can be directly contacted with the first interference element 32 is depressed to be engaged with the teeth 33 of the first interference element 32. For instance, the free end 36' of the pole 36 of the second interference element 34 is depressed as V shape.

The second interference element operating apparatus 40 deliver the rotation force of the rotor R to the second interference element 34 without contact as using magnetism.

That is, the second interference element operating apparatus 40 comprises the first magnet gear 42 equipped at the rotor R to be rotated in one structure with the rotor R, the second magnet gear 44 rotated by the magnetism generated between with the first magnet gear 42 during the rotation of the first magnet gear and also coupled as inserted with the second interference element 34 to be contacted as rubbed with the second interference element 34, and a stopper 46 capable of transfer the rotation force of the rotor R through the second interference element operating apparatus 40 to the second interference element 34 only during the backward rotation CCW of the rotor R.

The first magnet gear 42 is formed a ring shape as the multitude of north pole 42A and the multitude of south pole 42B are arranged by turns along the circumference of the first magnet gear 42. The number of the multitude of north pole 42A and the multitude of south pole 42B of the magnet first gear 42 can be established variously as considering the speed of the rotation and etc. between the first and second magnet gears 42, 43. It is possible for the magnet gear 42 to be coupled with the inductor rotor 10 or with the synchronous machine rotor 20, and also possible to be coupled with both of the inductor rotor 10 and the synchronous machine rotor 20 together. It is described set limited that the first magnet gear 42 is coupled with the inductor rotor 10 on the following present embodiment. The first magnet gear 42 is positioned at the outside of the rotor R in the axial direction so as not to interfere the interaction between the rotor R and the stator 2. The first magnet gear 42 is positioned between the rotor R and the first interference element 32 in the axial direction of the rotor R to be coupled with the inductor rotor 10 without interfering the interaction between the first and the second interference elements 32, 34. Therefore, the first magnet gear 42 is coupled with a side of the motor bracket 9 of the inductor rotor 10 as laminated in the axial direction of the inductor rotor 10.

The second magnet gear 44 has a ring-shaped structure that a multitude of North pole 44A and a multitude of South pole 44B are arranged by turns along the circumference of the second magnet gear 44. The number of the multitude of north pole 42A and the multitude of south pole 42B of the second magnet gear 42 can be decided variously as considering the speed of the rotation and etc. between the first and second magnet gears 42, 43. The second magnet gear 44 support the second magnet gear 44 by equipped as a structure filling the inside of the multitude of the ring-shaped north pole 44A and the south pole 44B, and further comprises the second magnet gear hub 44C coupled as inserted with the second interference element 34. A boss unit 44D that the inner hub 35A of the second interference element 34 is inserted to be coupled as inserted with the second interference element 34 is protruded on the center of the second magnet gear hub 44C. If needed, viscous grease is laid between the boss unit 44D of the second magnet gear 44 and the inner hub 35A of the second interference element 34 for the second magnet gear to be rotate freely in relation to the second interference element 34 or for the second magnet gear 44 and the second interference element 34 to be rotated in one structure by the friction between the second magnet gear 44 and the second interference element 34. The second magnet gear 44 is arranged the first magnet gear 42 with a predetermined gap as capable of rotating in the radial direction of the first magnet gear 42, and supported at the motor bracket 9 as coupled to be rotated.

The stopper 46 is capable of generating interference with the first interference element 34 only when the second interference element 34 rotates backward CCW of the rotor R as limiting the rotation angle of the second interference element 34 as capable of rotating only by a predetermined angle toward the opposite of the first interference element 32 against the rotation center of the second interference element 34. For instance, the stopper 46 may be projections positioned between the both ends of the outer hub 35B of the second interference element 34 in the circumference direction of the outer hub 35B of the second interference element 34. The above-mentioned stopper 46 having a structure of projections is protruded from the motor bracket 9.

The operation of the motor according to the first embodiment of the present invention will be described on the following.

The revolving field is formed by the stator 2 when the power is applied to the coil 8 of the stator 2 through the motor driving circuit unit, the synchronous machine rotor 20 is rotated first with a synchronous speed by the revolving field according to the stator 2. Then, the flux generated by the rotation of the inductor rotor 20 acts as the revolving field, thus the inductor rotor 10 has a slip and is rotated as the inductor rotation principle. The rotation driving force of the present invention is generated through the driving shaft 16 rotated in one structure with the inductor rotor 10 when the inductor rotor 10 is rotated.

In case that the rotor R is rotated forward CW, as illustrated on FIG. 3, the first magnet gear 42 is rotated forward CW with the rotor R, and the second magnet gear 44 is rotated by the magnetism between the first and the second magnet gears 42, 44 when the motor according to the present embodiment is operated. Here, the second magnet gear 44 is rotated in the opposite direction of the rotating direction, counter clockwise direction, of the first magnet gear 42. When the second magnet gear 44 is rotated, the second interference element 34 receives the rotation force in the rotating direction of the second magnet gear 44 from the second magnet gear 44 by the friction contact with the second magnet gear 44. Here, if the second interference element 34 is not in contact with the stopper 46, it is rotated toward the stopper 46 with the second magnet gear 44, and if it is in contact with the stopper 46, the rotation is restricted by the stopper 46.

Therefore, the second interference element 34 is stopped as in contact with the stopper 46, and the second magnet gear 44 is rotated freely in relation to the second interference element 34 by the magnetism with the first magnet gear 42. Furthermore, the interference between the first and second interference elements 32, 34 are not generated, because the pole 36 of the second interference element 34 is apart from the trace of the rotation 32' of the first interference element 32.

On the other hand, when the motor according to the present embodiment is operated, the first magnet gear 42 is rotated backward CCW with the rotor R when the rotor R is rotated backward CCW, the second magnet gear 44 is rotated in the clockwise direction, and the second interference element 34 is rotated toward the first interference element 32. At this time, the second interference element 34 is rotated with the second magnet gear 44 as in friction contact with the second magnet gear 44 by the viscosity of the grease put between with the second magnet gear 44. When the second interference element 34 is rotated toward the first interference element 32, the pole 36 of the second interference element 34 is entered by the trace of the rotation 32' of the first interference element 32, thus the interference is generated as the pole 36 of the second interference element 34 and the teeth 33 of the first interference element 32 are engaged.

Therefore, the backward rotation of the rotor R is controlled with the first and second interference elements 32, 34, and the rotor R is rotated forward by the opposite force.

Here, when the rotor R is rotated forward after controlling the backward rotation of the rotor R, the second interference element 34 is rotated toward the stopper 46 with the second magnet gear 44 as well as the first interference element 32 goes over the second interference element 34, thus the pole 36 of the second interference element 34 is apart from the trace of the rotation 32' of the first interference element 32. Therefore, the interference operation between the first and second interference elements 32, 34 is released.

Figure 5:
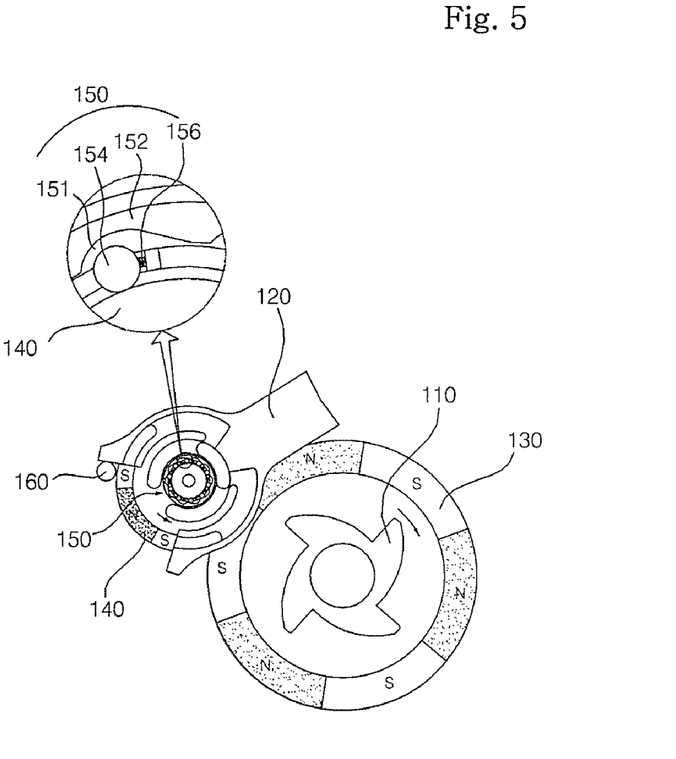
FIG. 5 show a plane view illustrating the forward rotation movement of the rotor of the motor according to the second preferred embodiment of the present invention.
Figure 6:
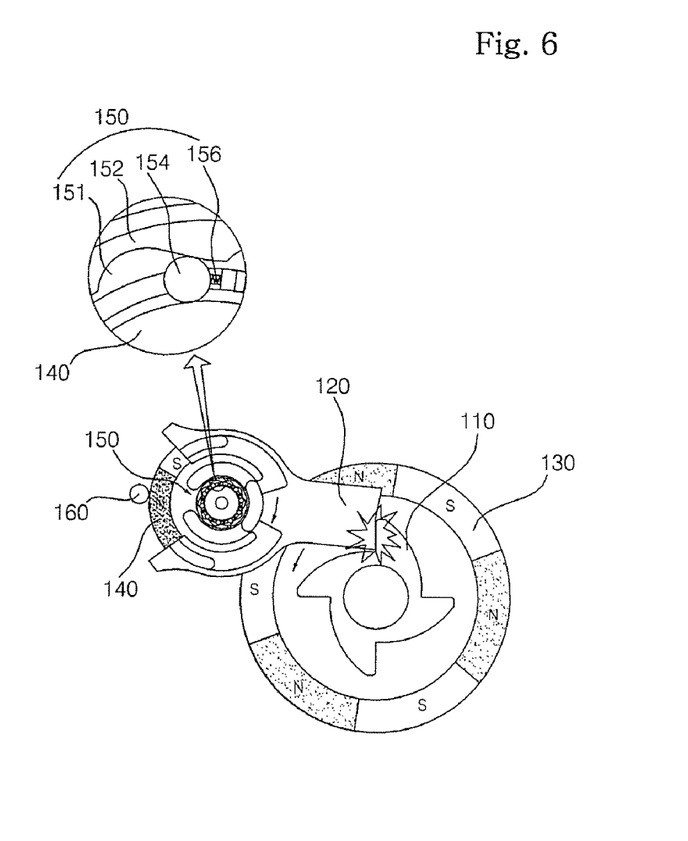
FIG. 6 shows a plane view illustrating the backward rotation controlling movement of the rotor of the motor according to the second preferred embodiment of the present invention.
Figure 7:
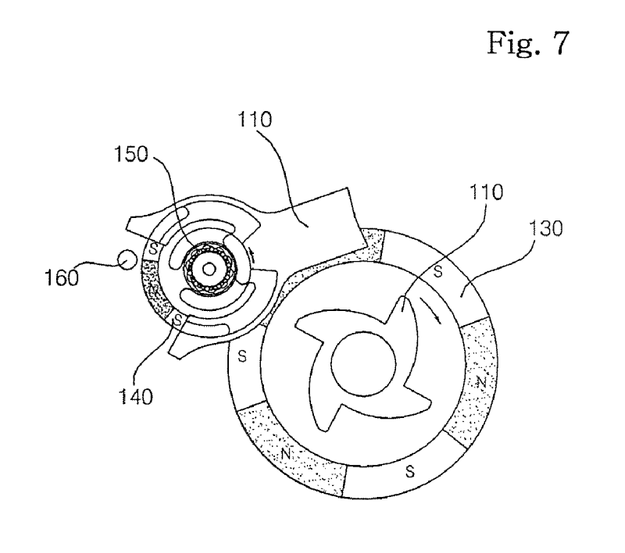
FIG. 7 shows a plane view illustrating the movement during the forward rotation of the rotor of the motor according to the second preferred embodiment of the present invention after controlling the backward rotation of the rotor.

FIG. 5 is a plane figure illustrating the forward rotation movement of the rotor of the motor according to the second preferred embodiment of the present invention, FIG. 6 is a plane figure illustrating the backward rotation controlling movement of the rotor of the motor according to the second preferred embodiment of the present invention, and FIG. 7 is a plane figure illustrating the movement during the forward rotation of the rotor of the motor according to the second preferred embodiment of the present invention after controlling the backward rotation of the rotor.

The duplicated description on the composition identified with the first embodiment of the present invention is omitted, because the other compositions and operations excepting the motor and the rotor backward rotation control apparatus of the motor according to the second embodiment can be identified with the motor according to the first embodiment.

The motor backward rotation control apparatus according to the second embodiment of the present invention comprises the first interference element 110 fixed at the rotor, the second interference element 120 interfering the backward rotation of the rotor as in contact with the first interference element 110 when the rotor rotates backward, the first magnet gear 130 fixed on the rotor, the second magnet gear 140 engaged with the first magnet gear 130 and coupled with the second interference element 120, and the one way clutching apparatus 150 rotating the second interference element 120 with the second magnet gear 140 only when the rotor is rotated backward as installed between the second magnet gear 140 and the second interference element 120.

The one way clutching apparatus 150 is composed of an outer ring 152 arranged at the outside of the second magnet gear 140 as capable of rotated, fixed at the second interference element, and has a cam face 152 of multitude quipped rdially on the inside wall, a roller of multitude 154 interposed between the outer ring 152 and the second magnet gear 140, and a spring 156 equipped between the rollers.

The rotor backward rotation preventing apparatus further comprises the stopper 160 limiting the rotation degree of the second interference element 120 when the rotor is rotated forward.

The movement of the motor according to the second embodiment of the present invention is described on the following.

The first magnet gear 130 is rotated toward the counter clockwise direction and the second magnet gear 140 is rotated toward the clockwise direction when the rotor is rotated backward as illustrated on FIG. 6. In addition, the second interference element 120 is rotated toward the clockwise direction with the second magnet gear 140 and, enters by the trace of the rotation of the first interference element as the second magnet gear 140 and the second interference element 120 are locked by the one clutching apparatus 150.

Then, the first and second magnet gears 130, 140 are not rotated as first and second interference elements 110, 120 are engaged as in contact each other, thus the backward rotation is stopped, and the rotor is rotated forward by the reaction.

When the rotor is rotated forward, as illustrated on FIGS. 7 and 5, the first magnet gear 130 is rotated forward and the second magnet gear 140 is rotated toward the counter clockwise direction. At this time, the locking of the second magnet gear 140 and the second magnet gear 140 is released, and rotated freely in relation to the second interference element 120 as the second interference element 120 is released by the one way clutching apparatus 150.

The second interference element 120 is restricted by the stopper 160 after rotated toward the counter clockwise direction and gets out of the trace of the rotation of the first interference element 110 as the first interference element 110 goes over the second interference element with touching.

Figure 8:
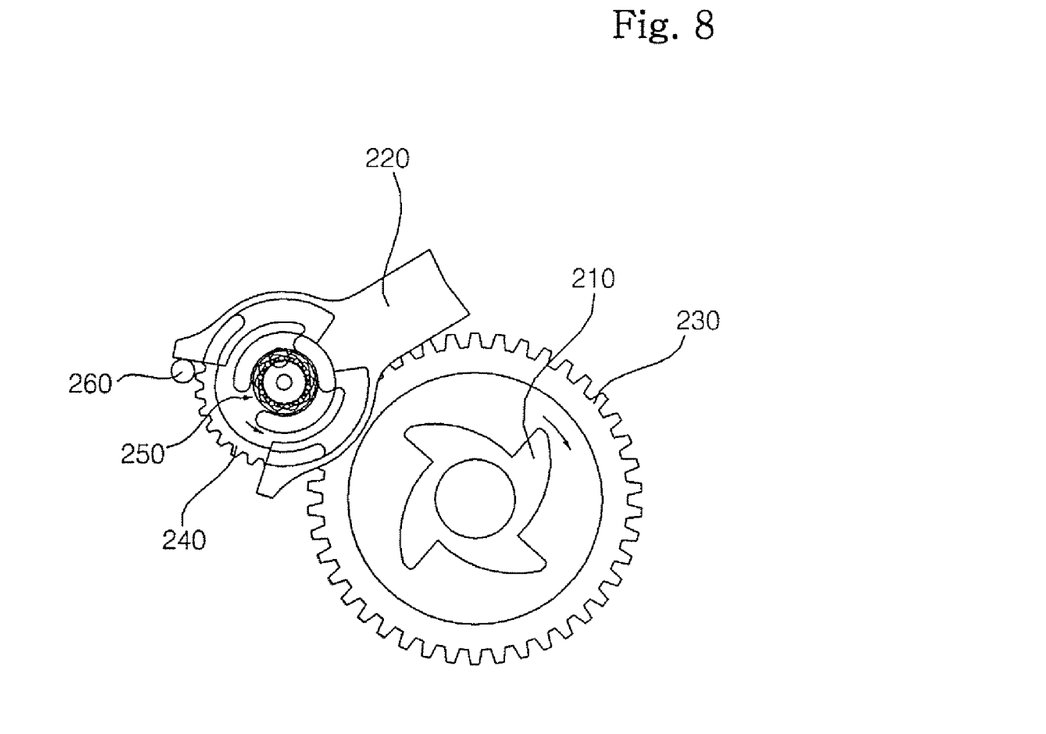
FIG. 8 shows a plane view illustrating the forward rotation movement of the rotor of the motor according to the third preferred embodiment of the present invention.
Figure 9:
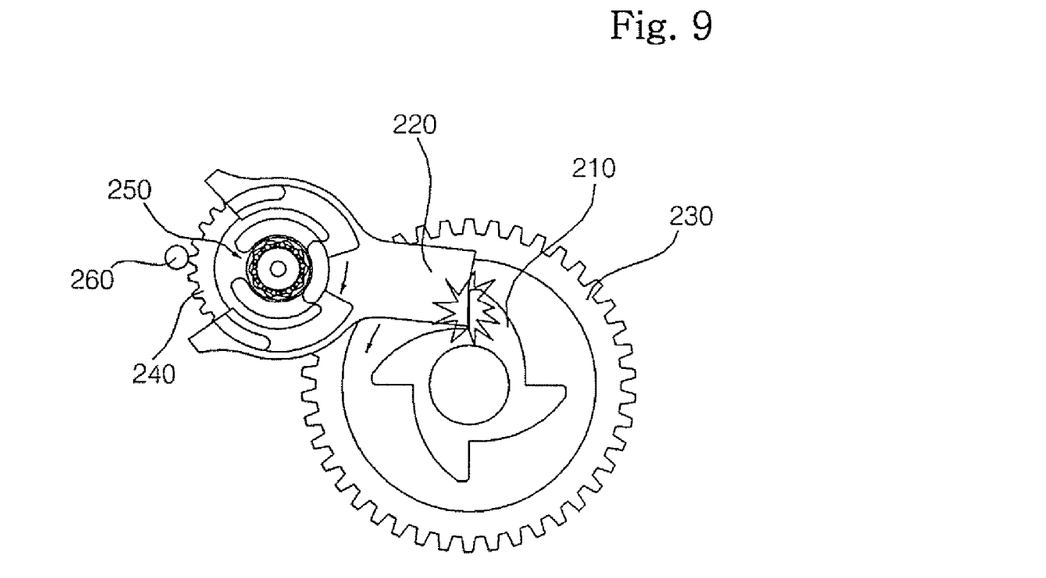
FIG. 9 shows a plane view illustrating the rotation regulating movement of the rotor of the motor according to the third preferred embodiment of the present invention.

FIG. 8 is a plane figure illustrating the forward rotation movement of the rotor of the motor according to the third preferred embodiment of the present invention, and FIG. 9 is a plane figure illustrating the rotation regulating movement of the rotor of the motor according to the third preferred embodiment of the present invention.

The duplicated description on the composition identified with the first embodiment of the present invention is omitted, because the other compositions and operations excepting the motor and the rotor backward rotation control apparatus of the motor according to the third embodiment can be identified with the motor according to the first embodiment.

The motor backward rotation control apparatus according to the third embodiment of the present invention comprises the first interference element 210 fixed at the rotor, the second interference element 220 interfering the backward rotation of the rotor as in contact with the first interference element 210 when the rotor rotates backward, the first gear 230 fixed on the rotor, the second gear 240 rotating in gear with the first gear 230 and coupled with the second interference element 220, the one way clutching apparatus 250 rotating the second interference element 220 with the second gear 240 only when the rotor is rotated backward as installed between the second gear 240 and the second interference element 220, and the stopper 260 limiting the rotation degree of the second interference element 220 when the rotor is rotated forward.

The first and second gears 230, 240 are plane gears, and go in gear together at ordinary times.

The movement of the motor according to the third embodiment of the present invention is described on the following.

The first gear 230 is rotated toward the counter clockwise direction and the second gear 240 is rotated toward the clockwise direction when the rotor is rotated backward. Besides, the second interference element 220 is rotated toward the clockwise direction with the second gear 240, and enters by the trace of the rotation of the first interference element 210 as the second interference element 220 and the second gear 240 are locked by the one way clutching apparatus 250.

Then, the first and second gears 230, 240 are not rotated as the first and second interference elements 210, 220 are engaged as in contact each other, thus the backward rotation is stopped, and the rotor is rotated forward by the reaction.

When the rotor is rotated forward, the first gear 230 is rotated forward and the second gear 240 is rotated toward the counter clockwise direction. At this time, the locking of the second gear 240 and the second interference element 240 is released, and rotated freely in relation to the second interference element 220 as the second interference element 120 is released by the one way clutching apparatus 250.

The second interference element 220 is restricted by the stopper 260 after rotated toward the counter clockwise direction and gets out of the trace of the rotation of the first interference element 210 as the first interference element 210 goes over the second interference element 220 with touching.

As described above, when the rotor of the motor according to the present invention is rotated backward, the backward rotation of the rotor is certainly controlled in structure way as the second interference element receives the rotation force of the rotor by the magnetism and the rotor can be rotated forward by the reaction, thus the reliability of the motor is improved, the backward rotation is certainly controlled, and the structure of the circuit of the motor driving circuit unit is simple and the structure of the apparatus for controlling the backward rotation of the rotor is simple, because any separate controlling circuit for the operation of the second interference element isn't required.

The motor according to the present invention is also advantageous that the sensitive quality is improved by the operation noise of the apparatus controlling the backward rotation of the rotor is not generated as the first and the second magnet gears transfer the second interference element the rotation force of the rotor with the magnetism are planed as the non-contact method, and the structure is simple and the manufacturing cost is reduced as any separate structure for prevention of noise is unnecessary. Besides, the durability is improved by the apparatus controlling the backward rotation of the rotor is hardly abrased even after a ling time use.

What is claimed is:

1. A motor for controlling inverse rotation of a rotor comprising:
   a stator;
   a rotor rotated in a first direction by interaction with the stator;
   a first interference element mounted at the rotor to be rotated with the rotor;
   a second interference element configured to be engaged with the first interference element to control a rotation of the rotor in a second direction which is an inverse direction of the first direction; and
   a second interference element operating apparatus supplying rotary force of the rotor to the second interference element such that the second interference element is rotated toward the first interference element when the rotor is rotated in the second direction,
   wherein the second interference element operating apparatus comprises:
      a first magnet gear disposed on the rotor; and
      a second magnet gear rotated by interaction with the first magnet gear, the second magnet gear coupled with the second interference element to provide the second interference element with the rotary force by frictional contact with the second interference element.

2. The motor according to claim 1, wherein the motor is hybrid induction-type motor.

3. The motor according to claim 1,
   wherein the rotor comprises an inductor rotor and a synchronous machine rotor comprising magnets.

4. The motor according to claim 1,
   wherein the first interference element comprises a multitude of teeth arranged radially in relation to the center of rotation of the rotor.

5. The motor according to claim 4,
   wherein each of the teeth of the first interference element is inclined toward the second rotating direction in relation to the radial direction of the rotor.

6. The motor according to claim 1,
   wherein the first interference element is inclined toward the second rotating direction in relation to the radial direction of the rotor.

7. The motor according to claim 6,
   wherein a side of the teeth of the first interference element in the first rotation direction is curved against the radial direction toward the second rotation direction in relation to the radial direction of the rotor, and the other side in the second rotating direction is almost identical with the radial direction of the rotor.

8. The motor according to claim 1,
   wherein the second interference element comprises a hub coupled with the second interference element operating apparatus, and
   a pole capable of generating the engagement with the first interference element protruding from a side of the hub of the second interference element.

9. The motor according to claim 1,
   wherein an end part of second interference element engaged with the first interference element is depressed to insert the first interference element therein.

10. The motor according to claim 1, further comprising:
    a stopper limiting the degree of rotation of the second interference element so that the second interference element is rotated only a predetermined angle toward the opposite direction of the first interference element.

11. The motor according to claim 10,
    wherein the stopper is a projection generating the interference with the second interference element and is arranged next to the second interference element.

12. The motor according to claim 10,
    wherein the hub of the second interference element coupled with the second interference element operating apparatus is C-shaped, the hub having two ends, and the stopper is a projection positioned between both ends of the hub.

13. The motor according to claim 1,
    wherein the second magnet gear is smaller than the first magnet gear.

14. A motor for controlling inverse rotation of a rotor comprising:
    a stator;
    a rotor rotated in a first direction by interaction with the stator;
    a first interference element mounted at the rotor to be rotated with the rotor;
    a second interference element configured to be engaged with the first interference element to control a rotation of the rotor in a second direction which is an inverse direction of the first direction; as rotated toward the first interference element for controlling the rotation in the second rotating direction of the rotor;
    a first magnet gear rotated with the rotor;
    a second magnet gear rotated by interaction with the first magnet gear; and
    a one way clutch disposed between the second magnet gear and the second interference element to allow the second interference element to be interfered with the first interference element by rotation of the second magnet gear when the rotor is rotated in the second direction.

15. The motor according to claim 14,
    wherein the motor is hybrid induction type motor.

16. The motor according to claim 14,
    wherein the motor is composed of an inductor rotor interacting with the stator by the principle of induction and a synchronous machine rotor interacting with the stator by the principle of the synchronous machine.

17. The motor according to claim 14,
    wherein the first interference element is inclined toward the second rotating direction in relation to the radial direction of the rotor.

18. The motor according to claim 14,
    wherein an end part of the second interference element to be engaged with the first interference element is depressed for the first interference element to be inserted.

19. The motor according to claim 14,
    wherein the second interference element operating apparatus includes a stopper limiting the degree of the rotation of the second interference element for the second interference element to be rotated only in a predetermined angle toward the opposite direction of the first interference element in relation to the center of the rotation.

20. The motor according to claim 19,
    wherein a hub of the second interference element coupled with the second interference element operating apparatus is a shape of ring a part is cut, and the stopper is a projection positioned between the both ends of the hub along the circumference of the hub.

* * * * *